(12) United States Patent
Sugioka et al.

(10) Patent No.: US 6,432,278 B2
(45) Date of Patent: Aug. 13, 2002

(54) METHOD FOR CONTROLLING REFRACTIVE INDEX OF SILICA GLASS

(75) Inventors: Koji Sugioka, Saitama (JP); Shlomo Ruschin, Tel Aviv (IL); Jie Zhang, Beijing (CN); Satoshi Wada, Miyagi (JP); Hideo Tashiro; Koichi Toyoda, both of Saitama (JP)

(73) Assignee: The Institute of Physical and Chemical Research, Saitama (JP)

( * ) Notice: Subject to any disclaimer, the term of this patent is extended or adjusted under 35 U.S.C. 154(b) by 0 days.

(21) Appl. No.: 09/765,674

(22) Filed: Jan. 22, 2001

Related U.S. Application Data

(63) Continuation-in-part of application No. 09/009,733, filed on Jan. 21, 1998, now abandoned.

(30) Foreign Application Priority Data

Mar. 26, 1997 (JP) .............................. 9-091523

(51) Int. Cl.[7] ................................. C07C 1/00
(52) U.S. Cl. ................................. 204/157.15
(58) Field of Search .................... 204/157.15

(56) References Cited

U.S. PATENT DOCUMENTS

| 5,707,908 A | 1/1998 | Komine et al. ............... 501/53 |
| 5,917,202 A | 6/1999 | Haitz et al. ................... 257/98 |

FOREIGN PATENT DOCUMENTS

JP           8-197266 A    *  8/1996

OTHER PUBLICATIONS

Takigawa et al., "Si–O Bond Breaking in SiO2 by Vacuum Ultraviolet Laser Radiation", J. of Non–Crystalline Solids, vol. 116, pp. 293–296. (no month available) 1990.*

"Refractive–index changes in fused silica produced by heavy–ion implantation followed by photobleaching" by J. Albert et al.; Optics Letters, vol. 17, No. 23, pp. 1652–1654, Dec. 1, 1992.

"Permanent photowritten optical gratings in irradiated silicate glasses" by G.M. Williams et al.; Optics Letters, vol. 17, No. 7 pp. 532–534, Apr. 1, 1992.

"Writing waveguides in glass with a femtosecond laser" by K.M. Davis et al.; Optics Letters, vol. 21, No. 21, pp. 1729–1731, Nov. 1, 1996.

Takigawa et al., "Silicon–Oxygen Bond Breading in Silica by Vacuum Ultraviolet Laser Radiation", J. Non–Cryst. Solids, vol. 116, Nos. 2–3, pp. 293–296. (1990), No Month Available.

Concise Science Dictionary, pp. 719–720. (1984), No Month Available.

* cited by examiner

Primary Examiner—Edna Wong
(74) Attorney, Agent, or Firm—Birch, Stewart, Kolasch & Birch, LLP

(57) ABSTRACT

A method for controlling an index of refraction of silica glass, and in particular quartz glass, is disclosed. The method for controlling the index of refraction of silica glass includes the use of a vacuum ultraviolet laser beam having the same or shorter wavelength absorbable by the silica glass. The vacuum ultraviolet laser beam is irradiated to the silica glass to cause photodissociation of a Si—O bond at the point of irradiation. An index of refraction may also be altered using a vacuum ultraviolet laser beam having a longer wavelength absorbable by the silica glass.

14 Claims, 4 Drawing Sheets

METHOD FOR CONTROLLING REFRACTIVE INDEX OF SILICA GLASS

This application is a continuation-in-part of application Ser. No. 09/009,733 filed on Jan. 21, 1998, now abandoned, the entire contents of which are hereby incorporated by reference.

BACKGROUND OF THE INVENTION

1. Field of the Invention

The present invention relates to a method for controlling an index of refraction of silica glass, and more particularly to a method for controlling a refractive index of silica glass wherein only a refractive index of the silica glass in a localized region on the surface thereof may be changed.

2. Related Art

Heretofore, because silica glass, quartz glass, and others, have excellent characteristic properties such as hardness, heat resistance, and chemical stability, in addition to high transmission in a wide range of wavelengths extending from ultraviolet to infrared light, they are often utilized for optical material or optoelectronic material.

Quartz glass exhibits an index of refraction of 1.46 when light having a 633 nm wavelength is irradiated thereon. If the index of refraction of quartz glass can be changed in only a localized area of a surface thereof, then the modified quartz glass may be advantageously utilized for optical material or optoelectronic material. Such modified quartz glass may be used as/in phase shifting devices, light wave-guides, optical integrated circuits, high-density optical memory, and for optical fiber grating.

However, the refractive index of quartz glass cannot be easily changed in only a localized region on the surface thereof. It is difficult to work with and control quartz glass because of its unique physical properties. This creates a problem in producing sufficient amounts of quartz glass having modified refractive indexes, and therefore, limits the amount of quartz glass for use as optical material or optoelectronic material.

There are known ion exchange methods and ion implantation methods useable for changing/modifying an index of refraction of optical materials, such as lithium niobate. Such modified optical materials are used in the devices, and for the applications, discussed hereinabove.

The ion exchange method involves exchanging an ion contained in an aqueous solution with an ion contained in a specific material. The material undergoes a lengthy treatment period (often several hours), which involves immersing the material in the aqueous solution having a very high temperature (around 300° C.). This lengthy treatment period is costly and is often difficult to expedite.

The ion implantation method involves implanting an ionized impurity in a specific material. The implanting of the ionized impurity requires the use of highly accelerated energy, which accomplishes the implanting step. However, the ion implantation method increases absorption of the material, which leads to an increase in transmission loss of light. The increase in absorption occurs as a result of damage incurred by the material during the ion implantation process. In addition, both the ion exchange and ion implantation methods require a photolithographic step. The photolithographic step is necessary for forming a minute pattern on/in a treated material.

J. Albert et al. have conducted a trial in which quartz glass was treated by ion implantation in order to change the index of refraction thereof. (J. Albert et al., Opt. Lett. 17, 1652 (1992)). In the trial, Si ion or Ge ion was implanted in quartz glass. The resulting change in the index of refraction ($\Delta n$) thereof of was $1.2 \times 10^{-3}$.

X-ray or gamma ray irradiation has also been used to attempt to change the index of refraction of quartz glass (G. M. Williams et al., Opt. Lett. 17, 532 (1992)). Using this method, the refractive index was modified, but the surface area irradiated with x-rays or gamma rays was darkened significantly. The surface was darkened to the extent that to the naked eye the darkening was discernable. The change in the index of refraction ($\Delta n$) had an order of magnitude of $10^{-5}$.

Known phase grating methods achieve a modification in the refractive index having an order of magnitude of approximately $10^{-5}$.

SUMMARY OF THE INVENTION

An object of the present invention is to provide a method for controlling an index of refraction of silica glass, and other materials. The method achieves control of an index of refraction, while concurrently minimizing treatment temperature, treatment time, direct patterning without requiring any photolithographic step. Nonetheless, formation of a minute structure is achievable according to the present invention.

In order to achieve the above described object and other objects of the present invention, provided are methods for controlling an index of refraction of silica glass and other materials. One method includes irradiating a vacuum ultraviolet pulsed laser beam, having the same as or shorter wavelength than a wavelength absorbable by silica glass, to the silica glass to cause photodissociation of a Si—O bond in an area of the silica glass irradiated with the vacuum ultraviolet pulsed laser beam, thereby controlling an index of refraction of the silica glass. A second method includes irradiating a first vacuum ultraviolet pulsed laser beam onto a surface of silica glass, the first vacuum ultraviolet pulsed laser beam having a wavelength shorter than a wavelength absorbable by the silica glass; and irradiating a second vacuum ultraviolet pulsed laser beam onto the surface of silica glass, the second vacuum ultraviolet pulsed laser beam having a wavelength longer than the wavelength absorbable by the silica glass, wherein the irradiating steps cause photodissociation of a Si—O bond in a surface area of the silica glass irradiated with the first and second vacuum ultraviolet pulsed laser beams.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A method for controlling a refractive index of silica glass according to a first embodiment of the present invention will be described in detail hereinafter by referring to the accompanying drawings.

Figure 1:
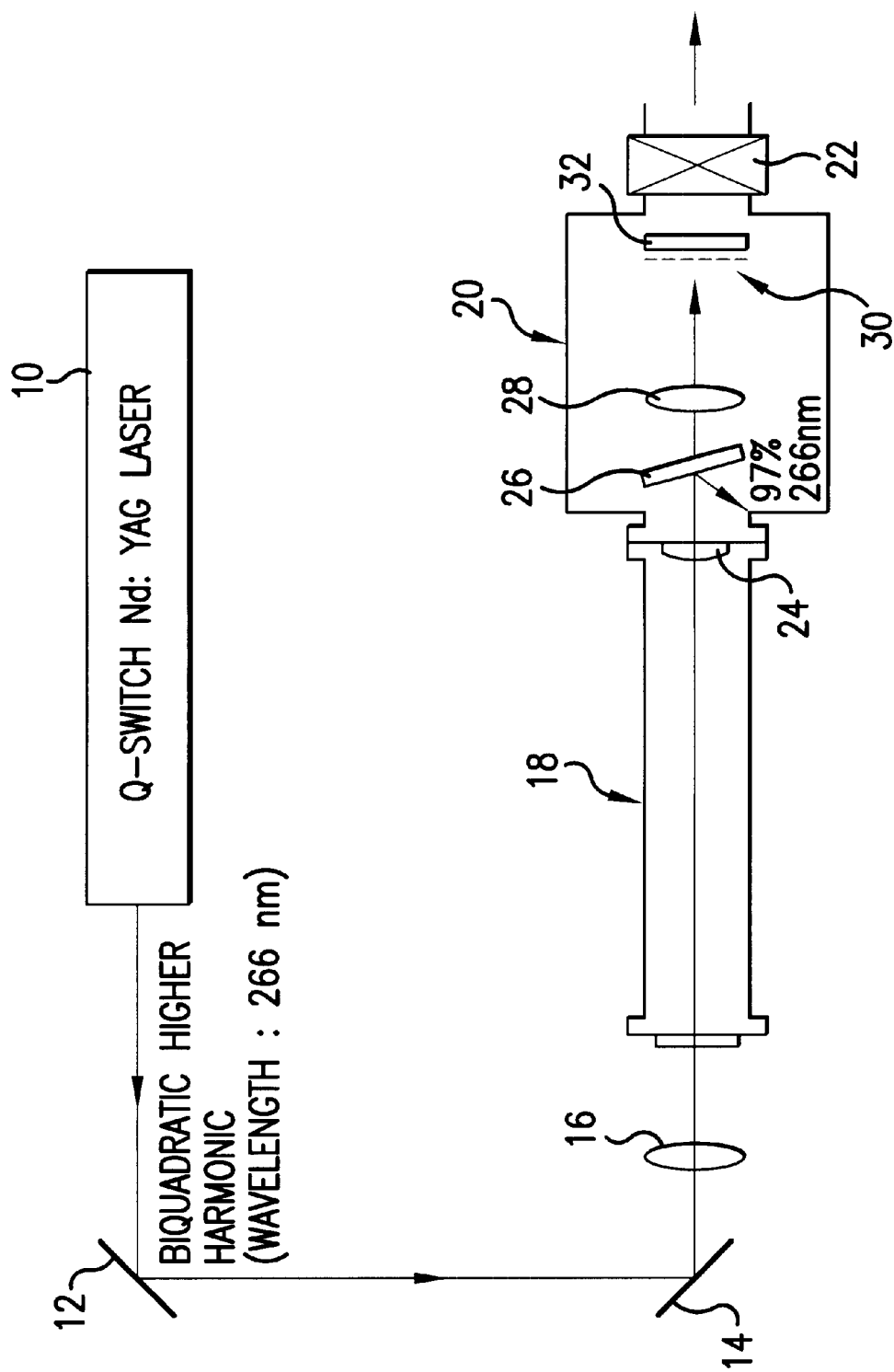
FIG. 1 illustrates an apparatus for implementing a method for controlling refractive index of silica glass according to a first embodiment of the present invention.

FIG. 1 illustrates an apparatus for implementing a method for controlling refractive index of silica glass according to a first embodiment of the present invention. The apparatus includes a Q-switch Nd:YAG laser 10 as an excitation laser light source, total reflection mirrors 12, 14, a condenser lens 16, a hydrogen Ramam cell 18 filled at a specific atmospheric pressure with hydrogen gas, a vacuum chamber 20 associated with the hydrogen Raman cell 18 through a collimater lens 24, and an exhauster 22 for maintaining the vacuum in the vacuum chamber 20.

The collimater lens 24 is attached to a laser beam output end of the hydrogen Raman cell 18, while a dichroic attenuator 26, a magnesium fluoride ($MgF_2$) lens 28 for focusing, a contact mask 30 having a structure of 25×25 $\mu m^2$ in mesh, and a quartz glass substrate 32 as a material to be processed, are each disposed in the vacuum chamber 20.

In the structure described above, a quadrupled higher harmonic (266 nm wavelength) excitation laser beam, produced by the Q-switch Nd:YAG laser 10, is inputted to the hydrogen Raman cell 18 by way of the total reflection mirrors 12, 14 and the condenser lens 16. Thus, when the laser beam of 266 nm wavelength is inputted to the hydrogen Raman cell 18, this laser beam undergoes Raman conversion in the hydrogen Raman cell 18, whereby a laser beam having fifteen oscillation lines ranging from a wavelength of 133 nm to wavelength of 594 nm, including having a wavelength of 266 nm, is outputted from the hydrogen Raman cell 18.

The wavelengths of the fifteen oscillation lines ranging from 133 nm to 594 nm wavelength are: 133 nm, 141 nm, 150 nm, 160 nm, 171 nm, 184 nm, 200 nm, 218 nm, 240 nm, 266 nm, 299 nm, 341 nm, 398 nm, 476 nm, and 594 nm.

Additionally, the laser beam containing fifteen oscillation lines ranging a wavelength of 133 nm to 594 nm, and outputted from the hydrogen Raman cell 18, has the highest pulse energy at 266 nm wavelength. The pulse energy reduces exponentially as the wavelength decreases.

The laser beam containing fifteen oscillation lines ranging from 133 nm wavelength to 594 nm wavelength, and being outputted from the hydrogen Raman cell 18, is inputted concurrently inside the vacuum chamber 18 through the collimater lens 24. The laser beam inputted inside the vacuum chamber 18 is attenuated 97% at 266 nm wavelength, which is the highest pulse energy, by the dichroic attenuator 26. This ensures the quartz glass substrate 32 does not undergo form and structure changes as a result of ablation, and the like. The laser beam having undergone 97% attenuation at the 266 nm wavelength is irradiated onto the quartz glass substrate 32 through the $MgF_2$ lens 28 and the contact mask 30. More specifically, in this case, a vacuum ultraviolet laser beam having a wavelength shorter than that of ultraviolet light, is irradiated onto the quartz glass substrate 32. A laser fluence (irradiation energy per 1 pulse unit area) of the sum total of all the wavelengths of the vacuum ultraviolet laser beam during the process is approximately 500 mj/$cm^2$.

Shown in Table I are various refractive indices of the quartz glass substrate 32 evaluated by an ellipsometer. A vacuum ultraviolet laser beam was irradiated onto the quartz glass substrate 32, while a pulse number of the vacuum ultraviolet laser beam was varied. The vacuum ultraviolet laser beam was produced using the embodiment illustrated in FIG. 1. The frequency of pulse of the vacuum ultraviolet laser beam was 1 Hz, and a pulse width was 2 nsec (nanoseconds).

TABLE I

| Pulse Number | Change in Refractive Index ($\Delta$ n) |
|---|---|
| 2.0 | 0.036 |
| 4.0 | 0.036 |
| 6.0 | 0.038 |

As is apparent from Table I, changes in the index of refraction ($\Delta n$) in a vicinity of the surface of the quartz glass substrate (a depth corresponding to around 633 nm wavelength of laser used in the ellipsometer) do not substantially depend upon pulse number. Results of the changes in the index of refraction ($\Delta n$) were 0.036 to 0.038.

From separate measurement for diffraction efficiency, the depth at which the index of refraction changes become deeper with an increase in the pulse number, such was estimated to be 1.23 $\mu m$ at 60 pulses.

Furthermore, no change was present in the structure and form of the quartz glass substrate 32 when observed by an optical microscope or electron microscope.

The changes in the index of refraction of the quartz glass are due to photodissociation of the Si—O bond in the quartz glass, which is caused by the irradiation of vacuum ultraviolet light, such as a vacuum ultraviolet laser beam, thereto. More specifically, when the vacuum ultraviolet laser beam is irradiated on the quartz glass substrate 32, $SiO_x$ (x<2) is formed in the area of irradiation due to photodissociation of the Si—O bond in the quartz glass. Using x-ray photoelectron spectroscopy (XPS), it has been confirmed $SiO_x$ (x<2) is produced in the area of the quartz glass substrate 32 irradiated by vacuum ultraviolet laser beam and the process of the first embodiment of the present invention.

SiO has a higher index of refraction than that of $SiO_2$. In particular, for $SiO_2$, when a laser beam having a wavelength of 633 nm, outputted from an He—Ne laser, is irradiated on glass quartz, the refractive index is 1.46. While for SiO, using the same laser, the resulting refractive index is 1.97. Accordingly, when the vacuum ultraviolet laser beam is irradiated to the quartz glass substrate 32, $SiO_x$ (x<2) is formed in an area irradiated due to photodissociation of the Si—O bond in the quartz glass. Therefore, the area irradiated undergoes an increase in the index of refraction.

Figure 2:
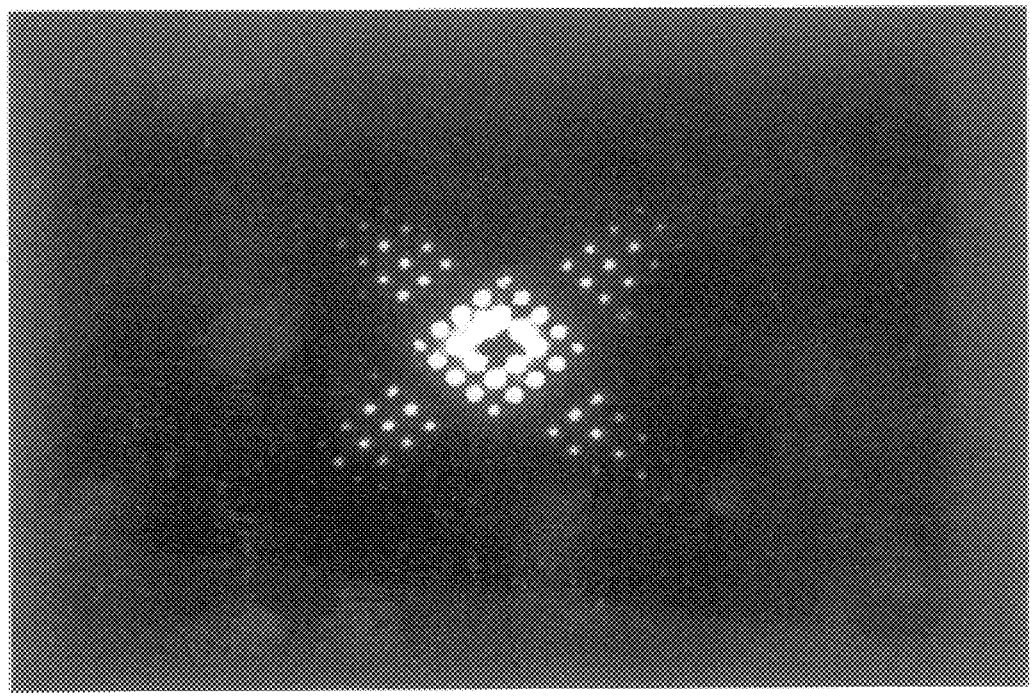
FIG. 2 is a photograph of a diffraction pattern obtained by irradiating a vacuum ultraviolet laser beam having a wavelength of 633 nm, outputted from a He-Ne laser, to a quartz glass substrate, where the irradiated vacuum ultraviolet laser beam is processed through a contact mask by utilizing the apparatus illustrated in FIG. 1.

FIG. 2 shows a photograph of diffraction pattern obtained by use of an irradiating laser beam (633 nm wavelength) output from the He—Ne laser. The quartz glass substrate 32 receives an irradiated vacuum ultraviolet laser beam through the contact mask 30 by way of the apparatus illustrated in FIG. 1. As is apparent from the photograph illustrated in FIG. 2, lattice diffraction patterns are formed up to a higher order. Therefore, it can be confirmed thereby that the index of refraction is controlled into a minute pattern on the quartz glass substrate 32.

In other words, when the vacuum ultraviolet laser beam is irradiated onto the quartz glass substrate through the contact mask 30, the index of refraction of the quartz glass substrate 32 is changed in only a fine localized region thereof. This allows the quartz glass substrate 32 to be utilized for optical material or optoelectronic material, thereby allowing its use in/for phase shifting devices, light wave-guides, optical integrated circuits, high-density optical memory, and optical fiber grating, or the like.

Using the process and apparatus according to an embodiment of the present invention, when the vacuum ultraviolet laser beam containing a number of wavelengths is irradiated to/on the quartz glass substrate 32, one specific wavelength contributes principally to the photodissociation of the Si—O bond. In particular, the photodissociation wavelength will be a wavelength having a shorter wavelength than an optical absorption edge of the quartz glass. Since wavelength of the light absorbed by quartz glass is substantially 170 nm, even if a vacuum ultraviolet laser beam having a single wavelength is irradiated to the quartz glass substrate 32, the same advantages as that of the above described embodiment of the present invention are obtained. However, the vacuum ultraviolet laser beam should have a wavelength shorter than 170 nm.

While vacuum ultraviolet pulsed laser beam has been used in the first embodiment of the present invention, other lasers may also be used if such is desired. For example, a vacuum ultraviolet continuous laser beam may also be used if desired. Alternatively, a vacuum ultraviolet lamp may also be used.

Furthermore, although the vacuum ultraviolet laser beam has been obtained by Raman conversion in the above-described manner. Other means of obtaining the vacuum ultraviolet laser beam may also be used if desired.

Moreover, while the first embodiment has been described for use with quartz glass in silica glass, the first embodiment of the present invention is not limited to quartz glass. The present invention may also be effective on silica glass containing $SiO_2$.

Figure 3:
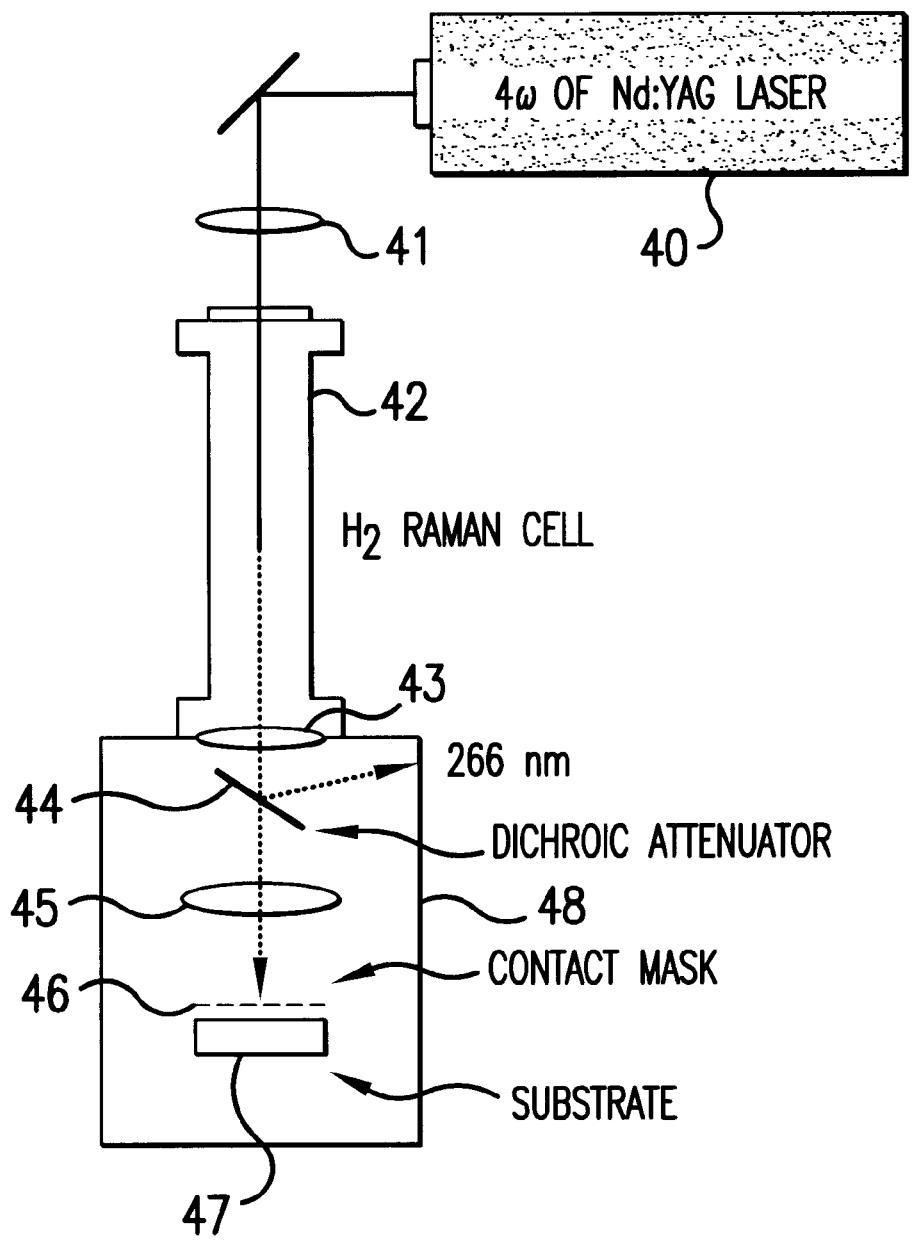
FIG. 3 illustrates an apparatus for implementing a method for controlling refractive index of silica glass according to a second embodiment of the present invention.

FIG. 3 illustrates an apparatus for implementing a method for controlling refractive index of silica glass according to another embodiment (second) of the present invention. As is seen in FIG. 3, the apparatus includes a $4\omega$ of Nd:Yag laser 40, a condenser lens 41, an $H_2$ Raman cell 42, a collimater lens 43, a dichroic attenuator 44, a magnesium fluoride ($MgF_2$) lens 45, a contact mask 46, and a substrate 47. The substrate is a quartz substrate, but other types of substrates may also be used if desired. The apparatus further includes a vacuum chamber 48. For brevity, the operation of the above elements will not be discussed in further detail, as the elements illustrated in FIG. 3 operate in a similar manner as those elements illustrated in FIG. 1. Moreover, the second embodiment of the present invention operates in the same manner as the first embodiment, unless otherwise stated.

According to the second embodiment of the present invention illustrated in FIG. 3, using a pulsed laser beam having the same or shorter wavelength than a wavelength absorbable by a given substrate, the above-described results of the first embodiment may be obtained. Moreover, according to the second embodiment, a pulsed laser beam having a longer wavelength than that absorbable by a given substrate may also be used while still obtaining the above-described results of the first embodiment. The method and apparatus according to the second embodiment of the present invention may also be used with materials other than silica glass.

The Nd:Yag laser 40 emits laser beams simultaneously at fifteen different wavelengths ranging from 133 nm to 594 nm. All of the laser beams simultaneously impinge on the substrate 47, which in this case is silica glass. The laser beams effectively control a refractive index of the silica glass upon impinging thereon. The dichroic attenuator 44 attenuates a part of the pulsed energy from the laser 40. In particular, wavelengths in the vicinity of 266 nm are significantly attenuated to prevent abrasions on the substrate 47.

Table II illustrates the estimated laser fluence of each laser wavelength, which impinges on the substrate 47.

TABLE II

| Wavelength (nm) | Laser Fluence (mj/cm$^2$) |
|---|---|
| 133 | 1.3 |
| 141 | 4.0 |
| 151 | 11.0 |
| 160 | 11.4 |
| 171 | 31.6 |
| 184 | 126.5 |
| 200 | 97.7 |
| 218 | 160.6 |
| 240 | 156.7 |
| 266 | 33.9 |
| 299 | <490 |
| 341 | <230 |
| 398 | <90 |
| 476 | <40 |
| 594 | <20 |

Only 20 pulses of such multiple wavelengths, simultaneously impinging on the substrate 47, provide a significant increase in the refractive index by as much as $3.6 \times 10^{-2}$. This is far less than the number of pulses required by known methods. In fact, according to the methods of the present invention, multi-wavelength radiation provides a 45-fold increase in the refractive index with the radiation of 1/1000, or less pluses.

Figure 4:
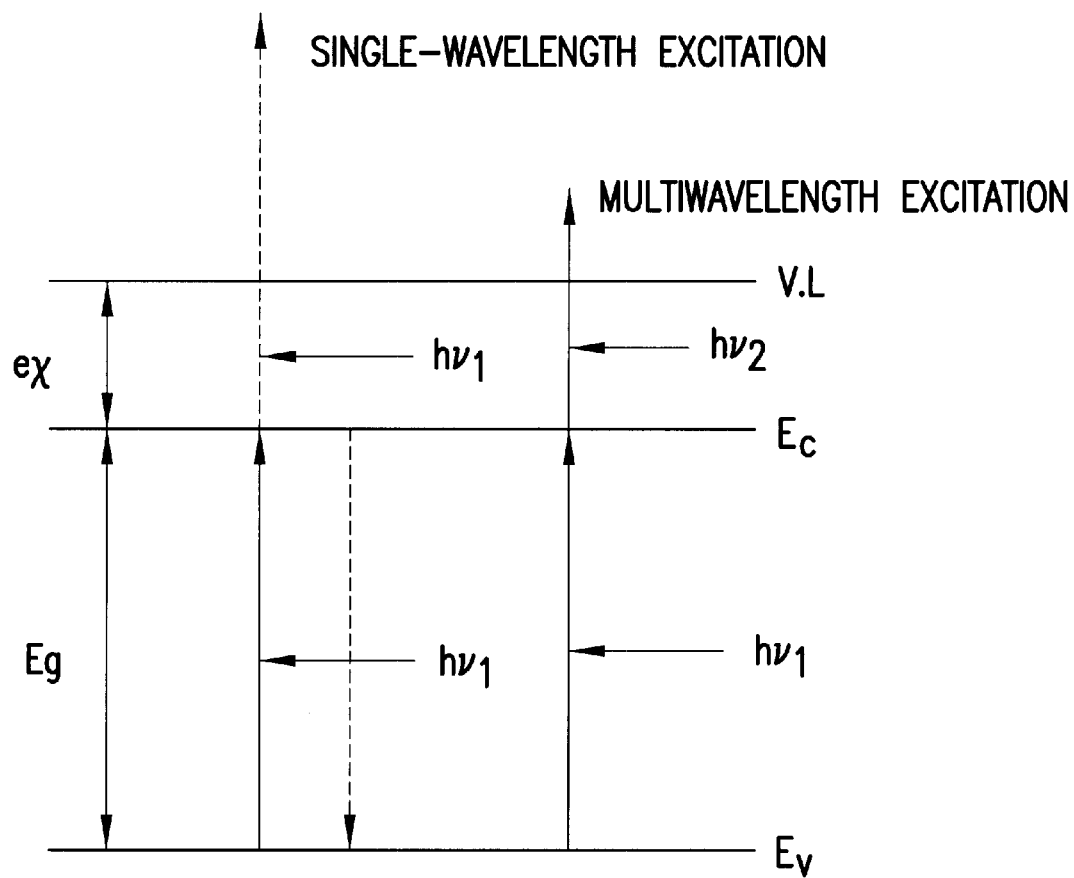
FIG. 4 illustrates multi-wavelength excitation according to the embodiments of the present invention in comparison with known single-wavelength excitation.

The foregoing is achieved for the following reasons. Illustrated in FIG. 4 is multi-wavelength excitation according to the embodiments of the present invention in comparison with known single-wavelength excitation. As is illustrated, radiation with laser light having a shorter wavelength than the absorption edge of silica glass would cause electrons to be excited from the valence band to the conduction band, or to the defect level. Therefore, radiation only with light shorter in wavelength than the absorption edge (illustrated left in FIG. 4) would naturally excite part of the excited electrons further up to an upper level (the vacuum level) to cause photodissociation to occur.

As is seen in the single wavelength excitation example, because the excited electrons of the silica glass have a life of a few nanoseconds, which is shorter than the width of the laser pulses (several tens of nanoseconds), many of the excited electrons will be relaxed (shown by the down arrow) again down to the valence band and therefore provide reduced efficiency of the photodissociation.

On the other hand, according to the multi-wavelength excitation of embodiments according to the present invention, light longer in wavelength than the absorption edge is simultaneously radiated to the substrate 47. The light of these wavelengths will not be absorbed by the substrate 47 under the ground state, however, it will be aggressively absorbed by excited levels, since the electron affinity of the substrate 47, in this case silica glass, is as small as 0.9 eV.

Therefore, the electrons excited by the light shorter in wavelength than the absorption edge will absorb efficiently, and the simultaneously impinged light longer in wavelength than the absorption edge will be released out of the vacuum level (illustrated on the right in FIG. 4). In other words, since only excited levels are to absorb the light longer in wavelength than the absorption edge, the excited electrons will be subject to resonant absorption before the electrons are relaxed. Thus, the result is efficient photodissociation, and the refractive index of the substrate 47 is controlled to the maximum extent.

The embodiments according to the present invention employ simultaneous radiation of laser beams of fifteen wavelengths. The methods and apparatus according to the embodiments can be performed by a combination of beams having shorter wavelengths than the absorption edge and beams having longer wavelengths than the absorption edge. The light having a wavelength longer than the absorption edge has photon energy that is greater than the electron affinity, or is equal to the band gap plus the electron affinity substracted by the photon energy of the light shorter in wavelength than the absorption edge. Moreover, if the indicated condition is satisfied, the reflective index control methods according to the embodiments of the present invention may be applied to materials other than silica glass.

The entire disclosure of Japanese Patent Application No. 9-91523 filed on Mar. 26, 1997 including specification, claims, drawings and summary are incorporated herein by reference in their entirety.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling an index of refraction of silica glass, comprising the step of:

irradiating a vacuum ultraviolet pulsed laser beam, having the same as or shorter wavelength than a wavelength absorbable by silica glass, to said silica glass to cause photodissociation of a SI—O bond in an area of said silica glass irradiated with said vacuum ultraviolet pulsed laser beam, thereby controlling an index of refraction of said silica glass, said laser beam having a laser fluence smaller than a threshold value fluence which causes surface structural change or surface damage.

2. The method according to claim 1, wherein said silica glass is quartz silica glass.

3. The method according to claim 1, wherein the step of irradiating includes the step of attenuating said vacuum ultraviolet pulsed laser beam by a predetermined percentage.

4. The method according to claim 1, wherein the step of irradiating irradiates said silica glass with said vacuum ultraviolet pulsed laser beam having a wavelength shorter than 170 nm.

5. The method according to claim 1, wherein the step of irradiating uses said vacuum ultraviolet pulsed laser beam having a 1 Hz frequency pulse.

6. The method according to claim 1, wherein the step of irradiating uses said vacuum ultraviolet pulsed laser beam having a pulse width of 2 ns.

7. The method according to claim 1, wherein the step of irradiating includes irradiating a plurality of vacuum ultraviolet pulsed laser beams onto a surface of said silica glass, said plurality of vacuum ultraviolet pulsed laser beams being irradiated in concert.

8. The method according to claim 7, wherein said plurality of vacuum ultraviolet pulsed laser beams includes at least fifteen unique vacuum ultraviolet pulsed laser beams.

9. The method according to claim 8, wherein each of said at least fifteen unique vacuum ultraviolet pulsed laser beams has a different wavelength.

10. The method according to claim 8, wherein one of said fifteen unique vacuum ultraviolet pulsed laser beams is attenuated before impinging upon said silica glass.

11. The method according to claim 7, wherein said plurality of vacuum ultraviolet pulsed laser beams include laser beams having the wavelengths 133 nm, 141 nm, 150 nm, 160 nm, 171 nm, 184 nm, 200 nm, 218 nm, 240 nm, 266 nm, 299 nm, 341 nm, 398 nm, 476 nm, and 594 nm.

12. The method according to claim 11, wherein the laser beam having a wavelength of 266 nm is attenuated by at least 97% before impinging on said silica glass.

13. A method for controlling an index of refraction of silica glass, comprising the steps of:

(a) irradiating a first vacuum ultraviolet pulsed laser beam onto a surface of silica glass, said first vacuum ultraviolet pulsed laser beam having a wavelength shorter than a wavelength absorbable by said silica glass; and (b) irradiating a second vacuum ultraviolet pulsed laser beam onto the surface of silica glass, said second vacuum ultraviolet pulsed laser beam having a wavelength longer than the wavelength absorbable by said silica glass, wherein said (a) and (b) irradiating steps cause photodissociation of a SI—O bond in a surface area of said silica glass irradiated with said first and second vacuum ultraviolet pulsed laser beams, said first and second laser beams having a laser fluence smaller than a threshold value fluence that causes a surface structural change or surface damage.

14. A method for controlling an index of refraction of silica glass, comprising the steps of:

irradiating a vacuum ultraviolet pulsed laser beam, having the same as or shorter wavelength than a wavelength absorbable by silica glass, to said silica glass to cause photodissociation of a Si—O bond in an area of said silica glass irradiated with said vacuum ultraviolet pulsed laser beam, thereby controlling an index of refraction of said silica glass; and attenuating said laser beam so as to prevent ablation of said silica glass.

* * * * *